US011330475B2

(12) United States Patent
Oh

(10) Patent No.: US 11,330,475 B2
(45) Date of Patent: May 10, 2022

(54) METHOD AND APPARATUS FOR PROVIDING RULE INFORMATION IN WIRELESS COMMUNICATION SYSTEM

(71) Applicant: Samsung Electronics Co., Ltd., Suwon-si (KR)

(72) Inventor: Jongsun Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 16/727,243

(22) Filed: Dec. 26, 2019

(65) Prior Publication Data
US 2020/0213909 A1 Jul. 2, 2020

(30) Foreign Application Priority Data
Dec. 28, 2018 (KR) .................. 10-2018-0172986

(51) Int. Cl.
*H04W 28/18* (2009.01)
*H04W 28/24* (2009.01)
(Continued)

(52) U.S. Cl.
CPC .......... *H04W 28/18* (2013.01); *H04W 28/24* (2013.01); *H04W 76/10* (2018.02); *H04W 76/20* (2018.02)

(58) Field of Classification Search
CPC ..... H04W 28/18; H04W 76/20; H04W 76/10; H04W 28/24
See application file for complete search history.

(56) References Cited

U.S. PATENT DOCUMENTS

2014/0040975 A1    2/2014   Raleigh et al.
2018/0192289 A1    7/2018   Dao
(Continued)

FOREIGN PATENT DOCUMENTS

CN    107580324 A    1/2018
CN    108337705 A    7/2018
(Continued)

OTHER PUBLICATIONS

Ericsson, 'PCC and N4 handling of ATSSS', S2-1811579, 3GPP TSG SA WG2 Meeting #129, Dongguan, P. R. China, Oct. 26, 2018, pp. 5-6, 9-12; and table 6.Y.2-1.
(Continued)

*Primary Examiner* — Chi H Pham
*Assistant Examiner* — Weibin Huang
(74) *Attorney, Agent, or Firm* — Jefferson IP Law, LLP

(57) ABSTRACT

The disclosure relates to a communication scheme and system for converging a $5^{th}$ generation (5G) communication system for supporting a data rate higher than that of a $4^{th}$ generation (4G) system with an Internet of things (IoT) technology. The disclosure is applicable to intelligent services (e.g., smart home, smart building, smart city, smart car or connected car, health care, digital education, retail, and security and safety-related services) based on the 5G communication technology and the IoT-related technology. A method for a control plane to transmit rule information to a user plane is provided. The method includes receiving PPC rule information from a PCF, identifying predetermined policy rule sets for a PDR set based on the PCC rule information, identifying rule set information corresponding to the PDR set, and transmitting the rule set information to the user plane, wherein the PDR set includes multiple pieces of PDR information.

18 Claims, 18 Drawing Sheets

(51) Int. Cl.
*H04W 76/20* (2018.01)
*H04W 76/10* (2018.01)

(56) References Cited

U.S. PATENT DOCUMENTS

| | | |
|---|---|---|
| 2018/0199240 A1 | 7/2018 | Dao et al. |
| 2018/0199243 A1 | 7/2018 | Bharatia |
| 2018/0199398 A1 | 7/2018 | Dao et al. |
| 2019/0182385 A1* | 6/2019 | Yan ................. H04M 15/41 |
| 2019/0349763 A1 | 11/2019 | Wu et al. |
| 2020/0267085 A1* | 8/2020 | Nie .................. H04L 47/2483 |
| 2020/0336321 A1* | 10/2020 | Ding ................. H04L 12/141 |
| 2020/0404467 A1* | 12/2020 | Yang ................. H04M 15/854 |
| 2021/0022204 A1* | 1/2021 | Alvarez Dominguez ................... H04W 76/34 |
| 2021/0127271 A1* | 4/2021 | Wu ................... H04W 28/0842 |

FOREIGN PATENT DOCUMENTS

| | | |
|---|---|---|
| CN | 108347416 A | 7/2018 |
| CN | 108366380 A | 8/2018 |
| WO | 2018/110939 A1 | 6/2018 |
| WO | 2018-137232 A1 | 8/2018 |
| WO | 2018/137334 A1 | 8/2018 |
| WO | 2018/137489 A1 | 8/2018 |
| WO | 2018/232605 A | 12/2018 |

OTHER PUBLICATIONS

Huawei, 'Interpretation of predefined Rules', C4-188571, 3GPP TSG CT WG4 Meeting #87, West Palm Beach, US, Nov. 30, 2018, section 5.4.9.
Ericsson, 'Updated conclusions on PCC, N4 and UPF functionality for ATSSS', S2-1811994, 3GPP TSG SA WG2 Meeting #129-BIS, West Palm Beach, USA, Nov. 20, 2018, pp. 1-5.
International Search Report and Written Opinion dated Apr. 7, 2020, issued in International Patent Application No. PCT/KR2019/018525.
Extended European Search Report dated Sep. 16, 2021, issued in a counterpart European Application No. 19904433.0.

* cited by examiner

FIG. 12

| Information elements | P | Condition / Comment | Appl. Sxa | Appl. Sxb | Appl. Sxc | Appl. N4 | IE Type |
|---|---|---|---|---|---|---|---|
| Node ID | M | This IE shall contain the unique identifier of the sending Node. | X | X | X | X | Node ID |
| CP F-SEID | M | This IE shall contain the unique identifier allocated by the CP function identifying the session. | X | X | X | X | F-SEID |
| Activate PDRSET | C | This IE shall be present for at least one PDRSET to be associated to the PFCP session. If there is no PDR<br>Several IEs with the same IE type may be present to represent multiple PDRSETs. | — | — | — | X | Activate PDRSET |
| Activate PDR | C | This IE shall be present for at least one PDR to be associated to the PFCP session. If there is no any PDR or PDRSET<br>Several IEs with the same IE type may be present to represent multiple PDRSETs. | X | X | — | X | Activate PDR |
| Create PDR | C | This IE shall be present for at least one PDR to be associated to the PFCP session. If there is no PDRSET<br>Several IEs with the same IE type may be present to represent multiple PDRs. See Table 7.5.2.2-1. | X | X | X | X | Create PDR |
| Create FAR | C | This IE shall be present for at least one FAR to be associated to the PFCP session.<br>Several IEs with the same IE type may be present to represent multiple FARs. See Table 7.5.2.3-1. | X | X | X | X | Create FAR |
| ............................3GPP document |  |  |  |  |  |  |  |

1500

PCC Rule-Base

| | | | | |
|---|---|---|---|---|
| 1510 | Rule-Base Name | DATA_PREPAID | TYPE | STATIC |
| 1520 | PDR SET NAME | DATA_PREPAID | | |
| 1530 | PCC RULE LIST | | | |
| 1540 | Index | name | | Precedence |
| | 1 | PCC_1 | | 1 |
| | 2 | PCC_2 | | 2 |
| | ............ | | | |

FIG. 16

PCC Rule

| | | | 1600 |
|---|---|---|---|
| Rule Name | PCC_1 | Precedence | 65500 |
| Flow Status | ACT | Reporting Level | Service ID |
| QCI | - | UMBR/DMBR | 100 Mbps |
| ARP | - | Charging Method | Online |
| Rating Group | 1 | Service Id | 11 |
| Packet Detect Rule | PKT_DECT_1 | | |
| PCC Filter LIST | | | |
| Index | Source IP/port | Destnation IP/port | |
| 1000 | Wildcard | 20.1.1.1 | |
| ............ | | | |

(1610 points to Rule Name row; 1620 points to Packet Detect Rule row)

FIG. 17

Packet Detection Rule-SET

| | | | | |
|---|---|---|---|---|
| 1710 | SET Name | DATA_PREPAID | TYPE | STATIC |
| 1720 | Packet Detection RULE LIST | | | |
| 1730 | Index | name | | Precedence |
| | 1 | PKT_DECT_1 | | 1 |
| | 2 | PKT_DECT_2 | | 2 |
| | ............ | | | |

1700

METHOD AND APPARATUS FOR PROVIDING RULE INFORMATION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2018-0172986, filed on Dec. 28, 2018, in the Korean Intellectual Property Office, the disclosure of which is incorporated by reference herein in its entirety.

BACKGROUND

1. Field

The disclosure relates to a $5^{th}$ generation (5G) core network. More particularly, the disclosure relates to a function of managing a traffic packet service quality (quality of service (QoS)), a frequency bandwidth, a policy and charging control (PPC), and system organization for a data service.

The disclosure relates to a method and apparatus for transmitting rule information in a wireless communication system and, in particular, to a method and apparatus for transferring information on a set of rules from a control plane to a user plane.

2. Description of Related Art

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System". Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system. In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like. In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "security technology" have been demanded for IoT implementation, recently there has been research into a sensor network, Machine-to-Machine (M2M) communication, Machine Type Communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected car, smart grid, health care, smart appliances, and advanced medical services through convergence and combination between existing Information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

In a 5G system, session information and a large number of traffic packet policy rules are transferred from a control plane (CP) to a user plane (UP) in order to provide data services to the subscribers attached to a wireless communication core network, which raises a problem in that the number of rules being transferred from the CP to the UP increases as content services being provided by a core system operator diversify and the number of subscribers increases.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a core network that is capable of reducing a signaling message size and the number of signaling messages between the CP and the UP by allowing the CP and the UP to share a database containing session-specific rule sets and, when a session is to be established, exchange only the information on the session-specific rule set suitable for the session between the CP and the UP.

Another aspect of the disclosure is to provide a method that is capable of allowing a CP to identify a plurality of predefined rule sets for a rule set associated with a session and send the information on the corresponding rule set to a UP and allowing the UP to retrieve the rules included in the rule set based on the rule set information received form the CP.

Another aspect of the disclosure is to provide a network that is capable of efficiently exchanging information on a plurality of session management policy-related rules between a CP and a UP.

Additional aspects will be set forth in part in the description which follows and, in part, will be apparent from the description, or may be learned by practice of the presented embodiments.

In accordance with an aspect of the disclosure, a method for a control plane to transmit rule information to a user plane is provided. The method includes receiving policy and charging control (PPC) rule information from a policy control function (PCF), identifying predefined policy rule sets for a packet detection rule (PDR) set based on the PCC rule information, identifying for the rule set information corresponding to the PDR set, and transmitting the rule set information to the user plane, wherein the PDR set includes multiple pieces of PDR information.

In accordance with another aspect of the disclosure, a method for a user plane to receive rule information from a control plane is provided. The method includes receiving rule set information from the control plane, identifying predefined policy rule sets for a packet detection rule (PDR) set based on the rule set information, identifying for multiple pieces of rule information based on the PDR set, and processing a data service packet based on the multiple pieces of rule information, wherein the PDR set includes multiple pieces of PDR information.

In accordance with another aspect of the disclosure, a control plane for sending rule information to a user plane is provided. The control plane includes a transceiver configured to receive policy and charging control (PCC) rule information from a policy control function (PCF), a controller configured to control to identify predefined policy rule sets for a packet detection rule (PDR) set based on the PCC rule information and identify the rule set information corresponding to the PDR set, and a storage unit configured to store the predefined policy rule sets, wherein the PDR set includes multiple pieces of PDR information.

In accordance with another aspect of the disclosure, a user plane for receiving rule information from a control plane is provided. The user plane includes a transceiver configured to receive rule set information from the control plane, a controller configured to control to identify predefined policy rule sets for a packet detection rule (PDR) set based on the rule set information, identify multiple pieces of rule information based on the PDR set, and process a data service packet based on the multiple pieces of rule informations, and a storage unit configured to store the predefined policy rule sets, wherein the PDR set includes multiple pieces of PDR information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 12 is a diagram illustrating a message format including information related to a rule set according to an embodiment of the disclosure;

FIG. 16 is a diagram illustrating a table exemplifying PCC Rule information corresponding to rule set information in use by a CP according to an embodiment of the disclosure;

FIG. 17 is a diagram illustrating a table exemplifying PDR set information including information on rule sets in use by a UP according to an embodiment of the disclosure.

Throughout the drawings, like reference numerals will be understood to refer to like parts, components, and structures.

DETAILED DESCRIPTION

Figure 1:
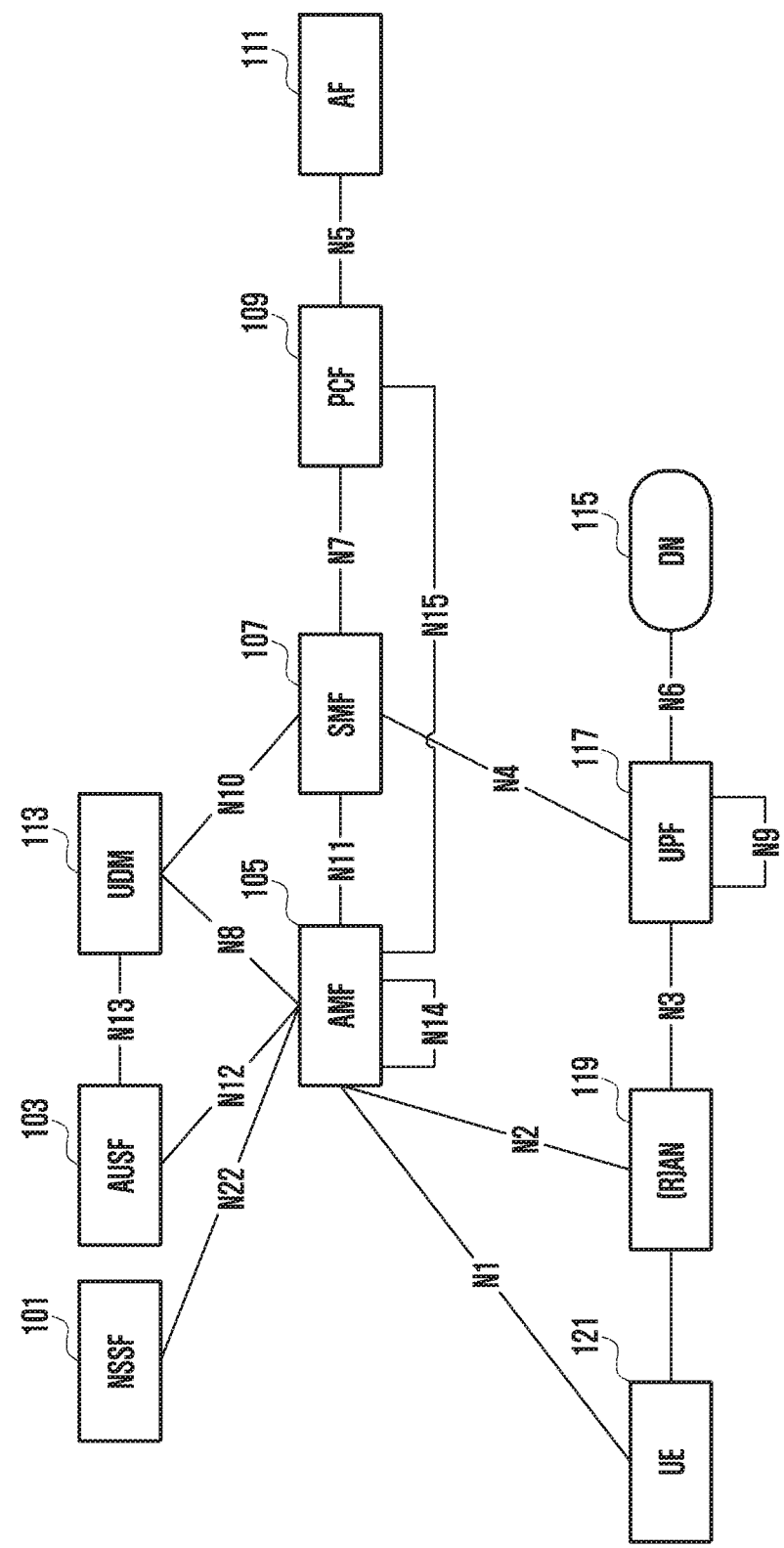
FIG. 1 is a diagram illustrating a 5G system architecture in reference point representation according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Detailed descriptions of well-known functions and structures incorporated herein may be omitted to avoid obscuring the subject matter of the disclosure. Various embodiments of the disclosure are described hereinafter in detail with reference to the accompanying drawings.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational operations to be performed on the computer or other programmable apparatus to produce a computer implemented process such that the instructions that are executed on the computer or other programmable apparatus provide operations for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card.

The terms used in the following description are provided to help understanding the disclosure and may be modified into different forms without departing from the technical spirit of the disclosure.

Definitions of terms used in the specification are set forth below.

In the following description, the terms indicating various access nodes, network entities, messages, interfaces between network entities, and information items are used for convenience of explanation of the disclosure. Accordingly, the terms used in the following description are not limited to specific meanings and they may be replaced by other terms that are equivalent in technical meaning.

In the following description, the terms and definitions given in the $3^{rd}$ Generation Partnership Project Long Term Evolution (3GPP LTE) standard are used for convenience of explanation. However, the disclosure is not limited by the terms and definitions, and it can be applied to other standard communication systems in the same manner.

In the disclosure, the term "base station" denotes a terminal node of a network for directly communicating with a terminal. In the disclosure, a certain operation described as being performed by the base station may be performed by an upper node of the base station in some cases. That is, it is obvious that various operations being performed for communication with a terminal in a network composed of a plurality of network nodes including base stations can be performed by the base station or any of other network nodes. The term "base station" may be replaced by another term such as "fixed station", "Node B", "evolved-NodeB (eNB)", "base transceiver system (BTS)", and "access point (AP)". A terminal may be fixed or mobile, and the term "terminal" may be replaced by another term such as "user equipment (UE)", "mobile station (MS)", "user terminal (UT)", "mobile subscriber station (MSS)", "subscriber station (SS)", "advanced mobile station (AMS)", "wireless terminal (WT)", "machine-type communication (MTC) device", "machine-to-machine (M2M) device", and "device-to-device (D2D) device".

In the following description, the term "downlink (DL)" refers to a communication link from a base station to a terminal, and the term "uplink (UL)" refers to a communication link from a terminal to a base station. In DL, the transmitter may be a part of the base station, and the receiver may be a part of the terminal. In UL, the transmitter may be a part of the terminal, and the receiver may be a part of the base station.

The terms used in the following description are provided to help understanding the disclosure and may be modified into different forms without departing from the technical spirit of the disclosure.

The disclosed embodiments may be supported by at least one of the standard documents of the Institute of Electrical and Electronics Engineers (IEEE) 802, 3GPP, and 3GPP2 offering radio access systems. That is, operations or parts that are not disclosed for making clear the technical spirit of the disclosed embodiments may be supported by the documents. All the terms used in the disclosure may be described in the standard documents.

Although the description is directed to the 3GPP 5G system for convenience of explanation, the technical aspects of the disclosure are not limited thereto.

Definitions of terms used in the disclosure are set forth below.

Evolved Packet System (EPS): A network system composed of an Evolved Packet Core (EPC) as an Internet Protocol (IP) based packet switched core network and an access network such as LTE and UTRAN. A network evolved from the Universal Mobile Telecommunications System.

eNodeB: A base station of the EPS network. The eNodeB is outdoor-installed and has a macro cell scale.

International Mobile Subscriber Identity (IMSI): A unique identifier that is assigned by a mobile communication network for globally identifying a user.

Public Land Mobile Network (PLMN): A network established for providing subscribers with a mobile communication service. A PLMN is established by an operator.

5G System (5GS): A system composed of a 5G access network (AN), a 5G core network, and UEs.

5G Access Network (5G-AN): An access network composed of a next generation radio access network (NG-RAN) connected to a 5G core network and/or a non-3GPP (non-5G) AN.

New Generation Radio Access Network (NG-RAN): A radio access network that is commonly characterized by connection to the 5GC and supporting at least one of the following options:
1) Standalone New Radio.
2) New radio as anchor supporting E-UTRA extension.
3) Standalone E-UTRA (e.g., eNodeB).
4) Anchor supporting new radio extension.

5G core network (5GC): A core network being connected to a 5G access network.

Network Function (NF): A processing function within a network that is adopted or defined by 3GPP and includes functional behaviors and interfaces defined by 3GPP.

NF service: A function exposed by an NF via a service-based interface and consumed by other authorized NF(s).

Network Slice: A logical network that provides specific network capability (capabilities) and network characteristic(s).

Network Slice Instance: A set of NF instance(s) and required resource(s) (e.g., computing, storage, and networking resources) that form a deployed network slice.

Protocol Data Unit (PDU) Connectivity Service: A service providing PDU(s) exchange between a UE and a data network.

Protocol Data Unit (PDU) Connectivity Service: A service providing PDU(s) exchange between a UE and a data network.

PDU Session: Association between a UE and a data network for providing the PDU Connectivity Service. An association type may fall in one of IP, Ethernet, and unstructured.

Non-Access Stratum (NAS): A functional layer for exchange of signaling and traffic messages between a UE and a core network in an EPS and 5GS protocol stack and taking charge of a function supporting UE mobility and session management procedures.

The 5G system as an evolution of the 4G LTE mobile communication system supports various radio access technologies such as new radio access technology (RAT), enhanced LTE (eLTE) based on Long Term Evolution (LTE), and non-3GPP access network (e.g., wireless local area network (WLAN)).

The 5G system is defined as service-based, and the interaction between network functions (NFs) in the architecture for the 5G system can be represented in two ways.

Reference point representation: Interaction between NF services in the NFs described by a point-to-point reference point (e.g., N11) between two NFs (e.g., AMF and SMF).

Service-based representation: Interaction where NFs (e.g., AMF) within the control plane (CP) enable other authorized NFs to access their services. This representation includes point-to-point reference points if necessary.

FIG. 1 is a diagram illustrating a 5G system architecture in reference point representation according to an embodiment of the disclosure.

Referring to FIG. 1, the 5G system architecture may include various components (i.e., network functions (NFs), and FIG. 1 depicts part of the components, which include a network slice selection function (NNSF) 101, an authentication server function (AUSF) 103, a (core) access and mobility management function (AMF) 105, a session management function (SMF) 107, a policy control function (PCF) 109, an application function (AF) 111, a unified data management (UDM) 113, a data network (DN) 115, a user plane function (UPF) 117, a (radio) access network ((R)AN) 119, and a user equipment (UE) 121.

The individual NFs provides the following functionalities.

The NSSF selects a non-common slice instance within a core network for providing the UE with a service. In detail, the NSSF 101 includes support for selecting a non-common slice instance capable of supporting the UE 121 in consideration of at least one of subscriber information and a specific parameter (e.g., UE usage type).

The AUSF 103 stores data for UE authentication.

The AMF 105 handles UE-level access and mobility management, and basically one AMF 105 serves one UE 121.

In detail, the AMF 105 includes support for inter-CN node signaling for inter-3GPP network mobility, termination of a RAN CP interface (e.g., termination of N2 interface), termination of NAS signaling (N1), NAS ciphering and integrity protection, AS security control, registration area management, connectivity management, idle mode UE reachability (including paging retransmission control and execution), mobility management control (subscription and policy), intra-system mobility and inter-system mobility, network slicing, SMF selection, Lawful Intercept (for AMF events and interface to LI system), session management (SM) message delivery between UE 121 and SMF 107, transparent proxy for SM message routing, access authentication, access authorization including roaming right check, SMS message delivery between UE 121 and SMF 107, security anchor (SEA) function, and security context management (SCM).

Some or all of the AMF 107 functionalities may be supported in a signal instance of an AMF.

The DN 115 corresponds to operator services, Internet access, or third party services. The DN 115 may transmit downlink PDUs to the UPF 117 or receive the PDUs transmitted by the UE 121 via the UPF 117.

The PCF 109 provides functionality for making a decision on a policy such as a mobility management policy and a session management policy based on the packet flow information received from an application server. In detail, the PCF 109 supports the unified policy frame for governing the network behavior, providing other CP functions (e.g., AMF 105 and SMF 107) with policy rules to be enforced, and implementing a front end interface for other functions to access subscription information relevant to policy decisions stored in a user data repository (UDR).

The SMF 107 takes charge of the session management function; if the UE 121 has a plurality of sessions, each session may be managed by a different SMF 107.

In detail, the SMF 107 includes support for session management (e.g., session establishment, modification, and release, including tunnel maintenance between UPF 117 and AN node), UE IP address allocation and management (including authentication optionally), UP function selection and control, traffic steering configuration for UPF to route traffic to a proper destination, termination of interfaces towards policy control functions, policy and QoS control handling, lawful interception (for SM events and interface to LI system), termination of SM parts of NAS messages, downlink data notification, initiation of AN-specific SM information (sent to AN over N2 via AMF), determination of SSC mode of a session, and roaming functionality. Some or all of the SMF functionalities may be supported in a single instance of an SMF 107.

The UDM 113 stores subscription information of the user, policy data, etc. The UDM 113 include two sections, i.e., application front end (FE) and user data repository (UDR).

The FE includes a UDM FE taking charge of location management, subscription management, and authentication credentials processing; and a PCF 109 taking charge of policy control. The UDR stores data required by the functions provided by the UDM-FE and policy profiles required by the PCF 109. The data being stored in the UDR includes subscriber identifiers, security credentials, user subscription data including access and mobility related subscription data and session related subscription data and policy data. The UDM-FE includes support for access to the subscription information stored in the UDR, authentication credential processing, user identification handling, access authentication, registration/mobility management, subscription management, and SMS management.

The UPF 117 sends downlink PDUs received from the DN 115 to the UE 121 via a (R)AN 119 and uplink PDUs received from the UE 121 via the (R)AN 119 to the DN 115.

In detail, the UPF 117 includes support for anchor point for intra-/inter-RAT mobility, external PDU session point of interconnect to data network, packet routing and forwarding, user plane part of packet inspection and policy rule enforcement, traffic usage reporting, uplink classifier for routing traffic flows to a data network, branching point to support a multi-homed PDU session, QoS handling for a user plane (e.g., packet filtering, gating, and UL/DL rate enforcement), uplink traffic verification (SDF to QoS flow mapping), transport level packet marking in uplink and downlink, and downlink packet buffering and downlink data notification triggering. Some or all of the UPF functionalities may be supported in an instance of a UPF 117.

The AF 111 interacts with the 3GPP core network in order to provide services (e.g. application influence on traffic routing, accessing network capability exposure function, and interaction with the policy framework for policy control).

The (R)AN 119 collectively refers to new radio access networks supporting the evolved-UTRA (E-UTRA) as an evolved version of the 4G radio access technology and new radio access technology (New Radio (NR)) (e.g., gNB).

The gNB supports radio resource management (i.e., radio bearer control, radio admission control, connection mobility control, and dynamic uplink/downlink resource allocation to a UE 121 (i.e., scheduling)), IP header compression, user data stream encryption and integrity protection, AMF selection for UE attachment in the case where routing to an AMF 105 is not determined based on the information provided to the UE 121, user plane data routing to UPF(s), control plane information routing to an AMF 105, connection setup and release, scheduling and transmitting a paging message (generated by the AMF 105), scheduling and transmitting system broadcast information (generated by the AMF 105 or operating and maintenance (O&M)), measurement and measurement report configuration for mobility and scheduling, transport level packet marking in the uplink, session management, network slicing, QoS flow management and data to radio bearer mapping, supporting a UE 121 in inactive mode, NAS message distribution, NAS node selection, radio access network sharing, dual connectivity, and tight interworking between NR and E-UTRA.

The UE means a user device. The user device may be referred to as a terminal, mobile equipment (ME), mobile station (MS), and the like. The user device may be a portable device (such as a laptop computer, a portable phone, a personal digital assistant (PDA), a smartphone, and a multimedia device) and a non-portable device such as (a desktop computer, personal computer and a vehicle-mounted device).

In the disclosure, an unstructured data storage network function (UDSF), a structured data storage network function (SDSF), a network exposure function (NEF), and an NF repository function (NRF) may interact with a relevant UDSF, NEF, and NRF, if necessary.

The NEF provides a means for securely exposing services and capabilities, e.g., third party internal exposure/re-exposure, application function, and edge computing, that are provided by the 3GPP network functions. The NEF receives information (based on the exposed capability (capabilities) of other network function(s). The NEF may store information as structured data received via an interface standardized as a data storage network function. The stored information may be re-exposed to other network function(s) and application function(s) and used for other purposes as analysis.

The NRF supports a service discovery function. The NRF receives an NF discovery request from an NF instance and provides the NF instance with the information on the discovered NF instance. The NRF also maintains available NF instances and services supportable with the NF instances.

The SDSF is an optional function for storage and retrieval of information as data structured by any NEF.

The UDSF is an optional function for storage and retrieval of information as unstructured data by any NF.

Although the description is directed to a reference model where a UE 121 accesses a DN 115 using a PDU session for convenience of explanation, the disclosure is not limited thereto.

The UE 121 may simultaneously access two data networks (i.e., local and central data networks) using multiple PDU sessions. In this case, two SMFs may be selected for different PDU sessions.

The UE 121 may also simultaneously access two data networks (i.e., local and central networks) provided in a PDU session.

In the 3GPP system, conceptual links connecting the NFs in the 5G system are defined as reference points. The 5G system architecture includes reference points as follows:

N1: Reference point between UE and AMF
N2: Reference point between (R)AN and AMF
N3: Reference point between (R)AN and UPF
N4: Reference point between SMF and UPF
N5: Reference point between PCF and AF
N6: Reference point between UPF and DN
N7: Reference point between SMF and PCF
N22: Reference point between AMF and NSSF
N24: Reference point between PCF in visited network and PCF in home network
N8: Reference point between UDM and AMF
N9: Reference point between two core UPFs
N10: Reference point between UDM and SMF
N11: Reference point between AMF and SMF
N12: Reference point between AMF and AUSF
N13: Reference point between UDM and AUSF
N14: Reference point between two AMFs
N15: Reference point between PCF and AMF in non-roaming scenario or between PCF of visited network and AMF in roaming scenario
N16: Reference point between two SMFs (SMF of visited network and SMF of home network in roaming scenario)
N17: Reference point between AMF and EIR
N18: Reference point between any NF and UDSF
N19: Reference point between NEF and SDSF In the disclosure, the SMF may have a function of the control plane (CP), and the UPF may have a function of the user plane (UP).

Figure 2:
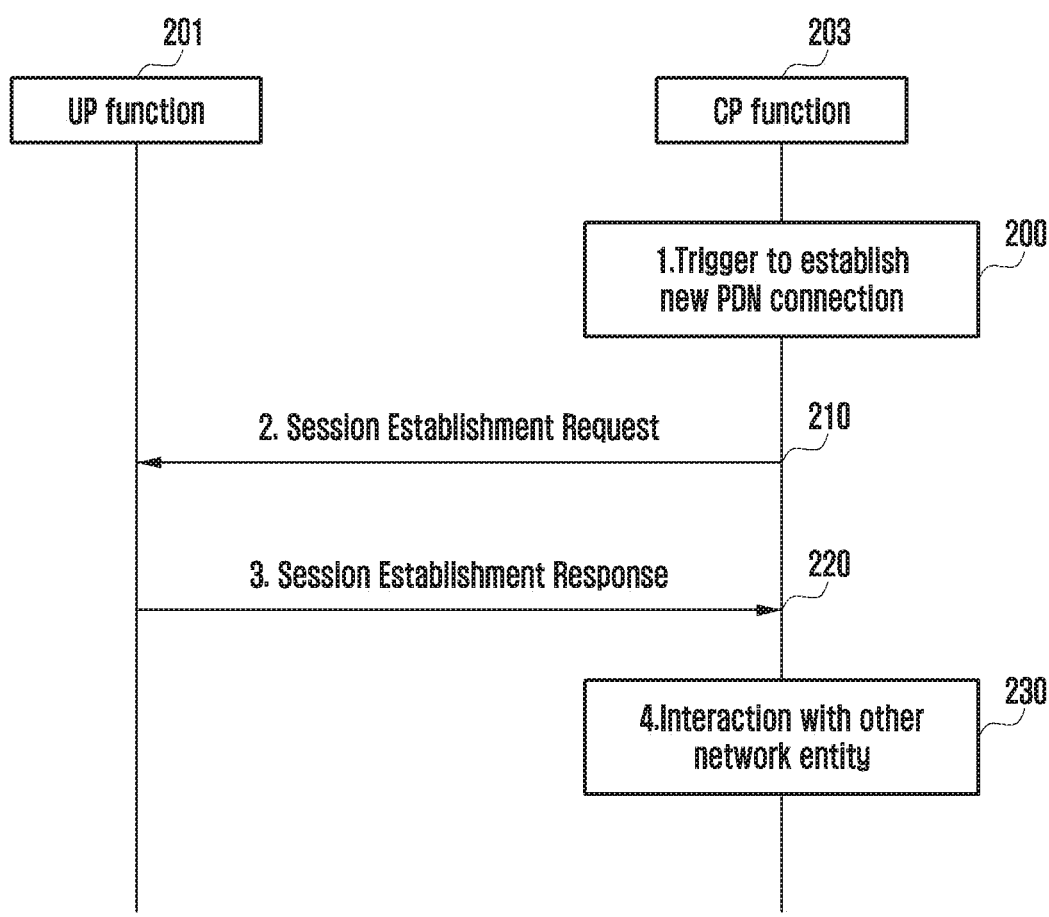
FIG. 2 is a signal flow diagram illustrating signal flows between a UP and a CP for a data service according to an embodiment of the disclosure.

FIG. 2 is a signal flow diagram illustrating signal flows between a UP and a CP for a data service according to an embodiment of the disclosure.

Referring to FIG. 2, at operation 200, a CP function 203 may trigger to establishing a new PDU connection.

At operation 210, the CP function 203 may send a session establishment request to a UP function 201.

At operation 220, the UP function 201 may send a session establishment response to the CP function.

At operation 230, the CP function 203 may interact with other network entities.

According to 3GPP TS documents, if a user requests for establishment of a session for use of a data service, the control plane may send the UP all of a packet detection rule, a usage reporting rule, a forwarding action rule, and a QoS enforcement rule for processing traffic using the session establishment request message aforementioned at operation 220.

Figure 3:
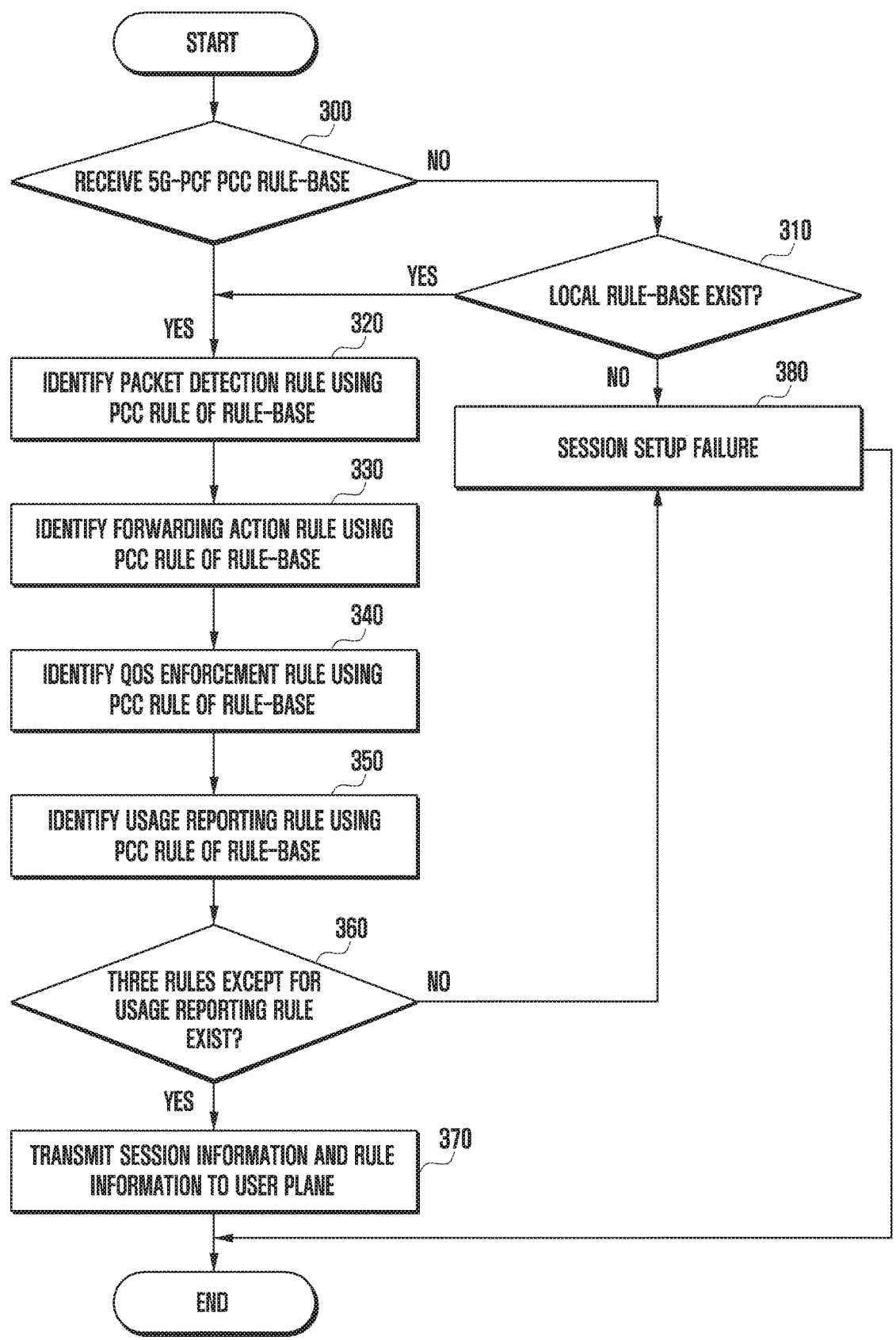
FIG. 3 is a flowchart illustrating a procedure for a CP to transmit information on multiple rules associated with a session to a UP for a data service according to a technology according to an embodiment of the disclosure.

FIG. 3 is a flowchart illustrating a procedure for a CP to transmit information on multiple rules associated with a session to a UP for a data service according to a technology according to an embodiment of the disclosure.

Referring to FIG. 3, if it is determined at operation 300 that PCC rule/rule-base information is not received from a 5G PCF and if it is determined at operation 310 that no local rule-base exists, the CP may assume session setup failure at operation 380 and terminate the procedure.

If it is determined at operation 300 that the PCC rule/rule-base information is received from the 5G PCF, or if it is determined at operation 300 that no PCC rule/rule-base information is received and if it is determined at operation 310 that the local rule-base exists, the CP may sequentially generate a packet detection rule at operation 320, a forwarding action rule at operation 330, a QoS enforcement rule at operation 340, and a usage reporting rule at operation 350, based on the PCC rule/rule-base.

If it is determined at operation 360 that three rules (i.e., packet detection rule, forwarding action rule, and QoS enforcement rule), except for the usage reporting rule among all the rules, exist, the CP may send, at operation 370, the session information and information on all of the aforementioned rules to the UP.

For example, the CP may send the UP all of the packet detection rule, usage reporting rule, forwarding action rule, and QoS enforcement rule for traffic processing using the session establishment request message aforementioned at operation 220 of FIG. 2.

Meanwhile, if it is determined at operation 360 that at least one of the packet detection rule, forwarding action rule, and QoS enforcement rule among all the rules except for the usage reporting rule does not exist, the CP may assume session setup failure at operation 380 and terminate the procedure.

As described above, the number of rules being transferred from the CP to the UP increases as the data and contents services that the core system operator provides to the users diversify, which causes increases of a message size and a signaling amount between the CP and UP, leading to overload in the core network and prolonging of the session setup time.

That is, the method described with reference to FIG. 3 entails, when a subscriber attaches to a mobile communication core network, transfer of session information and a large amount of traffic packet policy rules from the CP to the UP, which means an increase of the message size and the signaling amount between the CP and UP.

Figure 4:
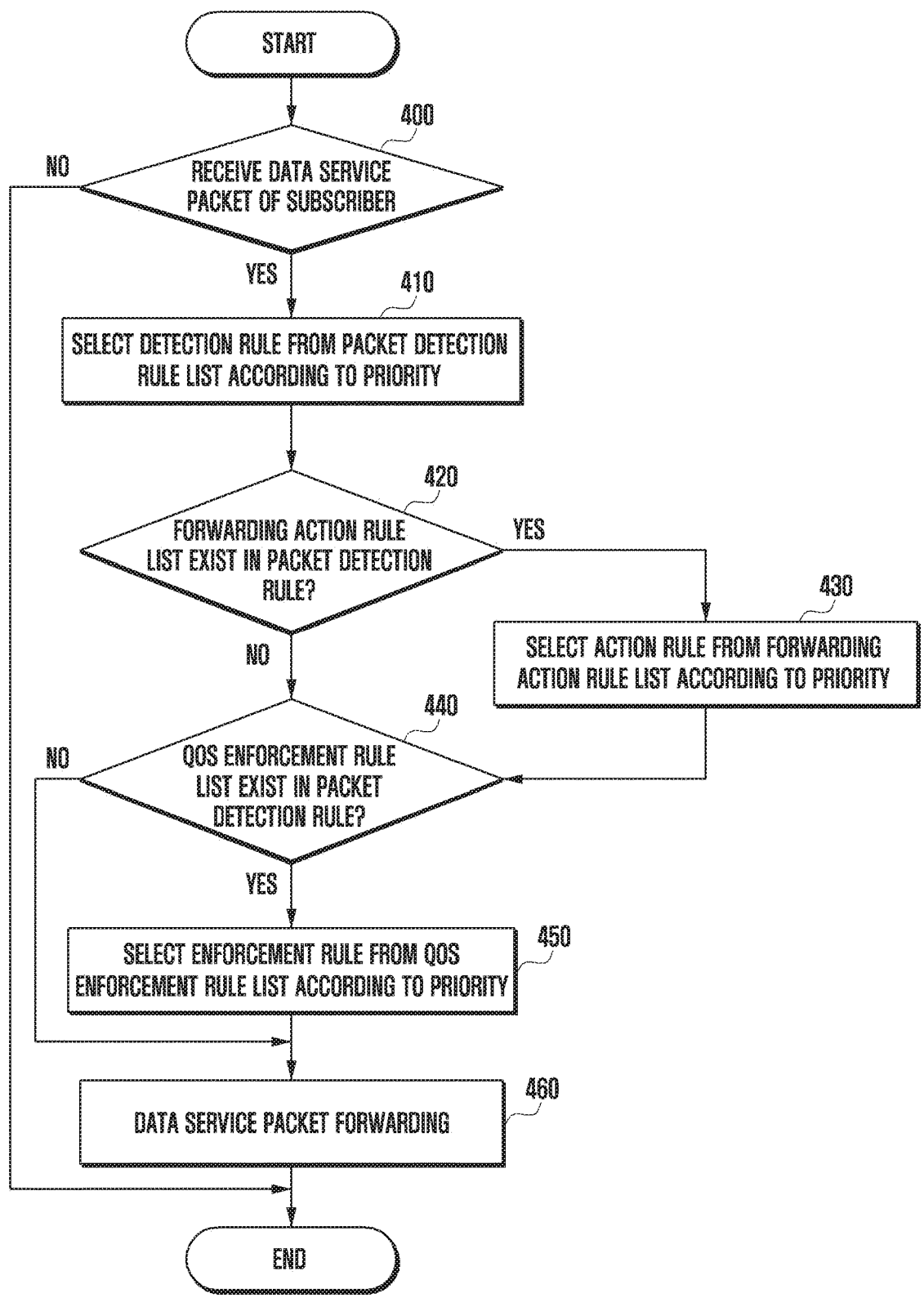
FIG. 4 is a flowchart illustrating a procedure for a UP to receive information on multiple rules from a CP for data services according to a technology according to an embodiment of the disclosure.

FIG. 4 is a flowchart illustrating a procedure for a UP to receive information on multiple rules from a CP for data services according to a technology according to an embodiment of the disclosure.

Referring to FIG. 4, if a data service packet for a subscriber is received at operation 400, the UP may select a detection rule from a packet detection rule list based on a priority order.

The UP may determine at operation 420 whether a forwarding action rule list exists in the packet detection rule and, if so, select, at operation 430, an action rule from the forwarding action rule based on a priority order, and determine at operation 440 whether a QoS enforcement rule list exists in the packet detection rule.

If it is determined at operation 420 that no forwarding action rule list exists in the packet detection rule, the UP may determine at operation 440 whether a QoS enforcement rule exists in the packet detection rule.

If it is determined at operation 440 that the QoS enforcement rule list exists in the packet detection rule, the UP may select, at operation 450, an enforcement rule from the QoS enforcement rule list based on a priority order and perform data service packet forwarding at operation 460.

If it is determined at operation 440 that no QoS enforcement rule list exists in the packet detection rule, the UP may perform data service packet forwarding at operation 460.

As described above, the UP may forward data service packets to the CP based on the session information and large amount of traffic packet policy rules.

In order to solve the problems described with reference to FIG. 3, the proposed method allows for the operator to store predefined policy rules and a policy rule set in the CP and UP in the form of a DB and for the CP to send only the information on the predefined policy rule set to the UP in generating a session for a subscriber such that the information on the policy rules included in the policy rule set is delivered to the UP through one-time signaling.

That is, the proposed method is capable of improving rule information signaling efficiency by reducing a message size between the CP and the UP in such a way of transmitting/receiving only the information on the policy rule set stored in the form of a DB.

Figure 5:
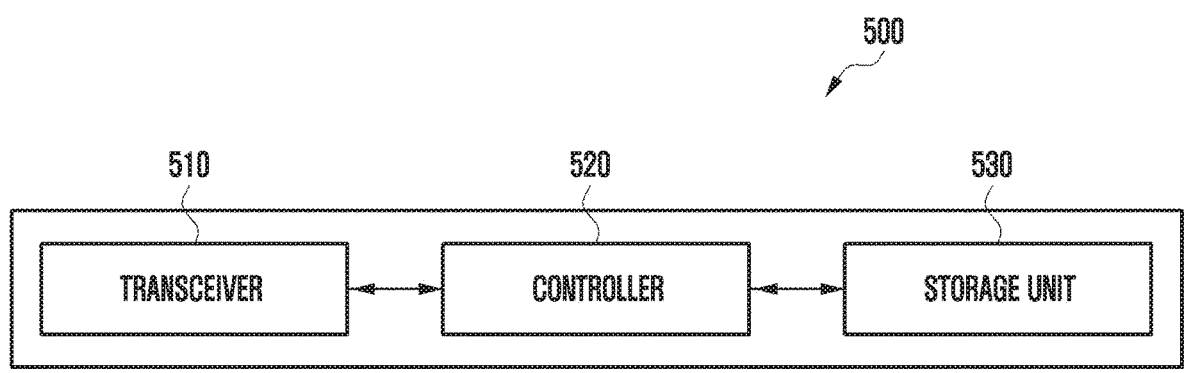
FIG. 5 is a block diagram illustrating a configuration of a CP according to an embodiment of the disclosure.

FIG. 5 is a block diagram illustrating a configuration of a CP according to an embodiment of the disclosure.

Referring to FIG. 5, a CP 500 may include a transceiver 510, a controller 520, and a storage unit 530. In the disclosure, the controller 520 may be defined as a circuit, an application-specific integrated circuit, or at least one processor.

The aforementioned components are described in detail hereinafter.

According to various embodiments, the transceiver 510 may communicate signals, information, and data with other network entities.

For example, the transceiver 510 may receive PCC rule information from a PCF.

For example, the transceiver 510 may transmit rule set information to the UP.

For example, the rule set information may be conveyed in at least one of a session establishment request message or a session modification request message.

According to various embodiments, the controller 520 may control overall operations of the CP. For example, the controller 520 may control signal flows among the components to perform the operations described with reference to the accompanying flowcharts.

For example, the controller 520 may identify a packet detection rule (PDR) set among predefined policy rule sets based on the PCC rule information.

For example, the predefined police rule sets may be stored in the CP and the UP in the form of a DB by an operator.

For example, the packet detection rule set may include information on multiple packet detection rules.

For example, the information on each of the packet detection rules included in the packet detection rule set may be mapped to the information on at least one of a forwarding action rule, a QoS enforcement rule, and a usage reporting rule.

For example, the controller 520 may identify the rule set information corresponding to the identified packet detection rule.

For example, the rule set information may include at least one of identity information, indication information, and index information of the packet detection rule set.

According to various embodiments, the storage unit 530 may store the predefined policy rules and policy rule set in the form of a DB, the predefined policy rules and policy rule set being provided by the operator.

For example, the storage unit 530 may include a memory, which may store data such as basic programs for the operations of the CP, application programs, and configuration information according to various disclosed embodiments. The memory may include at least one storage medium such as a flash memory type, a hard disk type, a multimedia card micro type, a card type memory (e.g., SD or XD memory), a magnetic disk, an optical disk, a random access memory (RAM), a static RAM (SRAM), a read-only memory (ROM), a programmable ROM (PROM), and an electrically erasable PROM (EEPROM). The processor may execute various operations with the programs, contents, and data stored in the memory.

Figure 6:
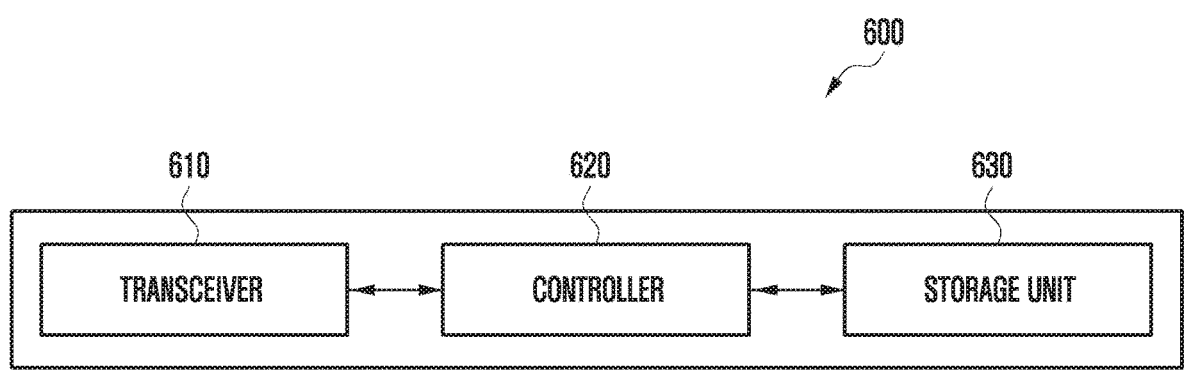
FIG. 6 is a block diagram illustrating a configuration of a UP according to an embodiment of the disclosure.

FIG. 6 is a block diagram illustrating a configuration of a UP according to an embodiment of the disclosure.

Referring to FIG. 6, a UP 600 may include a transceiver 610, a controller 620, and a storage unit 630. In the disclosure, the controller 620 may be defined as a circuit, an application-specific integrated circuit, or at least one processor.

The aforementioned components are described in detail hereinafter.

According to various embodiments, the transceiver 610 may communicate signals, information, and data with other network entities.

For example, the transceiver 610 may receive rule set information from a CP.

For example, the rule set information may include at least one of identity information, indication information, and index information of the packet detection rule set.

For example, the rule set information may be conveyed in at least one of a session establishment request message or a session modification request message.

According to various embodiments, the controller 620 may control overall operations of the UP. For example, the controller 620 may control signal flows among the components to perform the operations described with reference to the accompanying flowcharts.

For example, the controller 620 may identify predefined policy rule sets for a packet detection rule (PDR) set based on the received rule set information.

For example, the predefined policy rule sets may be stored in the CP and the UP in the form of a DB by an operator.

For example, the packet detection rule set may include information on multiple packet detection rules.

For example, the controller 620 may identify the packet detection rule set for multiple rules.

For example, the multiple rules may include a packet detection rule selected among multiple packet detection rules included in the packet detection rule set based on a priority order.

For example, the multiple rules may include at least one of a forwarding action rule, a QoS enforcement rule, and a usage reporting rule mapped to the selected packet detection rule.

For example, the controller 620 may process data service packets based on the multiple rules.

For example, the controller 620 may include a packet processor (not shown), which may apply the multiple rules to a session and forward the data service packets in the session.

According to various embodiments, the storage unit 630 may store the predefined policy rules and policy rule set in the form of a DB, the predefined policy rules and policy rule set being provided by the operator.

For example, the storage unit 630 may include a memory, which may store data such as basic programs for the operations of the CP, application programs, and configuration information according to various disclosed embodiments. The memory may include at least one storage medium such as a flash memory type, a hard disk type, a multimedia card micro type, a card type memory (e.g., SD or XD memory), a magnetic disk, an optical disk, a random access memory (RAM), a static RAM (SRAM), a read-only memory (ROM), a programmable ROM (PROM), and an electrically erasable PROM (EEPROM). The processor may execute various operations with the programs, contents, and data stored in the memory.

Figure 7:
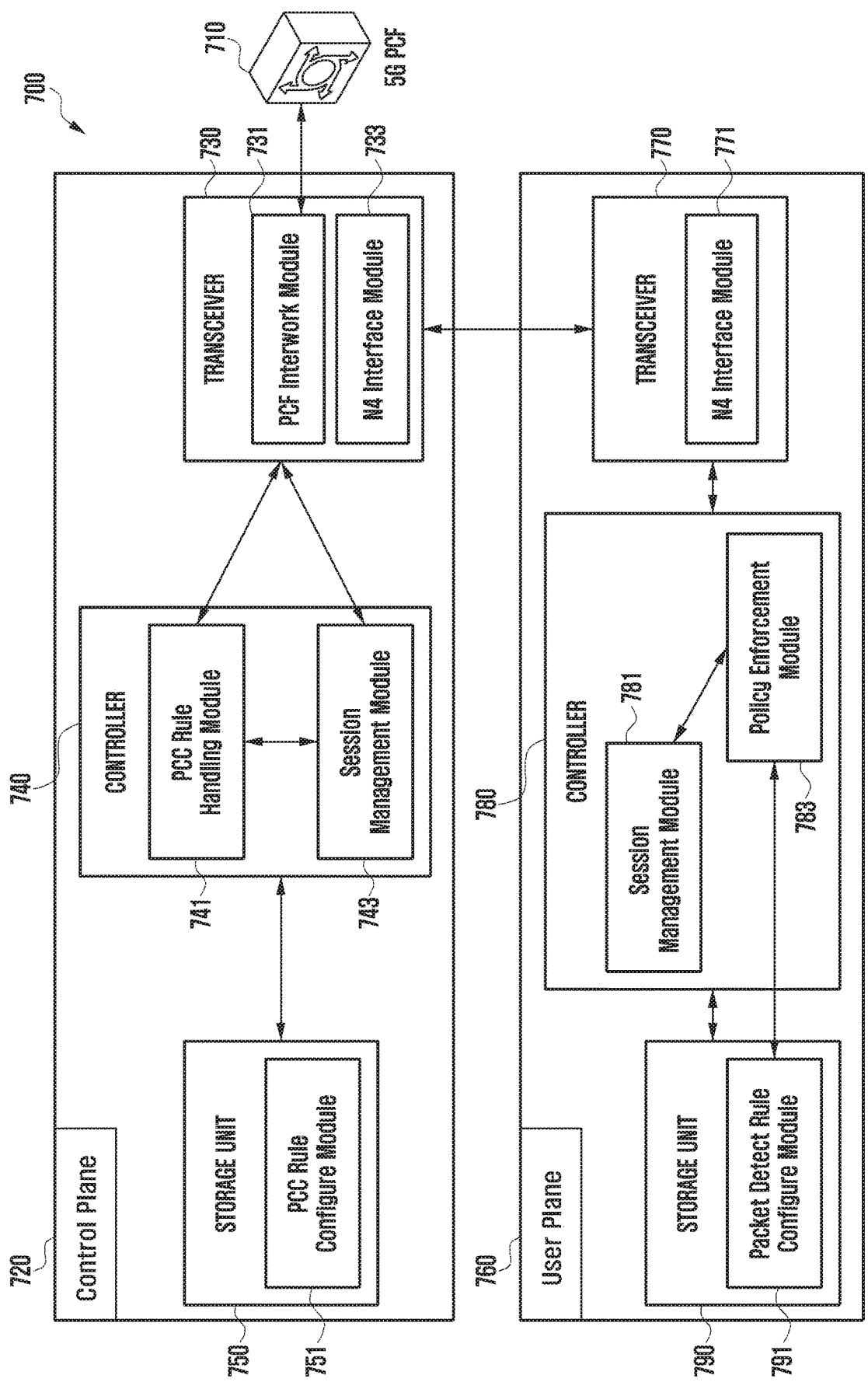
FIG. 7 is a block diagram illustrating a system including a CP and a UP according to an embodiment of the disclosure.

FIG. 7 is a block diagram illustrating a system including a CP and a UP according to an embodiment of the disclosure.

Referring to FIG. 7, a proposed system 700 may include a PCF 710, a CP 720, and a UP 760.

According to various disclosed embodiments, the PCF 710 may provide functionality for making a decision on a policy such as a mobility management policy and a session management policy based on the packet flow information received from an application server. In detail, the PCF supports the unified policy frame for governing the network behavior, providing other CP functions (e.g., AMF and SMF) with policy rules to be enforced, and implementing a front end interface for other functions to access subscription information relevant to policy decisions stored in a user data repository (UDR).

In the embodiment of FIG. 7, the CP 720 may include a transceiver 730, a controller 740, and a storage unit 750.

According to various disclosed embodiments, the transceiver 730 may include a PCF interwork module 731 and an N4 interface module 733.

For example, the PCF interwork module 731 may perform diameter communication for interworking with the PCF 710. The PCF interwork module 731 may also receive PCC rule/rule-base information for traffic policy of a subscriber from the PCF 710.

For example, the N4 interface module 733 may send rule information for applying a policy to the UP.

According to various disclosed embodiments, the controller 740 may include a PCC rule handling module 741 and a session management module 743.

For example, the PCC rule handling module 741 may receive PCC rule information of the subscriber from the PCF interwork module 731.

The PCC rule handling module 741 may determine traffic policy rules to be delivered to the UP based on the information received from the session management module 743 and send the information on the traffic policy rules to the session management module 743.

For example, the session management module 743 may communicate with access equipment for 5G service user call processing.

The session management module 743 may also exchange information with the PCC handling module for applying the PCC policy.

The session management module 743 may also control the transceiver 730 to send the rule information for applying the policy to the UP 760.

In this case, the transceiver 730 may further include the N4 interface module 733. For example, the rule information to be sent to the UP 760 may be information on a rule section including multiple rules.

According to various embodiments, the storage unit 750 may include a PCC rule configuration configure module 751.

For example, the PCC rule configure module 751 may store and register the predefined policy rules and policy rule set in an internal DB based on the PCC rule/rule-base information input by the operator.

For example, the policy rule set may include multiple policy rules associated with a session.

The PCC rule configure module 751 may also allow the PCC rule handling module 741 to refer to the generated PCC rule/rule-base.

In the embodiment of FIG. 7, the UP 760 may include a transceiver 770, a controller 780, and a storage unit 790.

According to various disclosed embodiments, the transceiver 770 may include an N4 interface module 771 to communicate with the CP 720 for data service traffic processing. For example, the transceiver 770 may receive rule information for applying the policy received from the CP 720. The rule information received by the UP 760 may be a rule set including multiple rules.

According to various disclosed embodiments, the controller 780 may include a session management module 781 and a policy enforcement module 783.

For example, the session management module 781 may control the transceiver 770 to communicate with the CP 720 for data service traffic processing.

For example, the session management module 781 may send the packet detection rule information or packet detection rule set information received from the CP 720 to the policy enforcement module 783.

For example, the policy enforcement module 783 may receive the rule/rule-base for data services from the session management module 781.

For example, the rule/rule-base may include the packet detection rule (Packet Detect Rule) or packet detection rule set (Packet Detect Rule Set) information.

For example, the policy enhancement module 783 may forward traffic service packets of the subscriber based on packet detection rule information, forwarding action rule information, and QoS enforcement rule information.

For example, the policy enforcement module 783 may control the transceiver 770 to send subscriber's usage amount information to the CP 720 based on the usage reporting rule information.

According to various disclosed embodiments, the storage unit 790 may include a packet detection rule configure module 791.

For example, the packet detection rule configure module 791 may store and register the Packet Detect Rule/Rule-Set information input by an operation in an internal DB.

The packet detection rule configure module 791 may also allow the policy enforcement module 783 to refer to the generated packet detection rule (Packet Detect Rule) or packet detection rule set (Packet Detect Rule Set) information.

Figure 8:
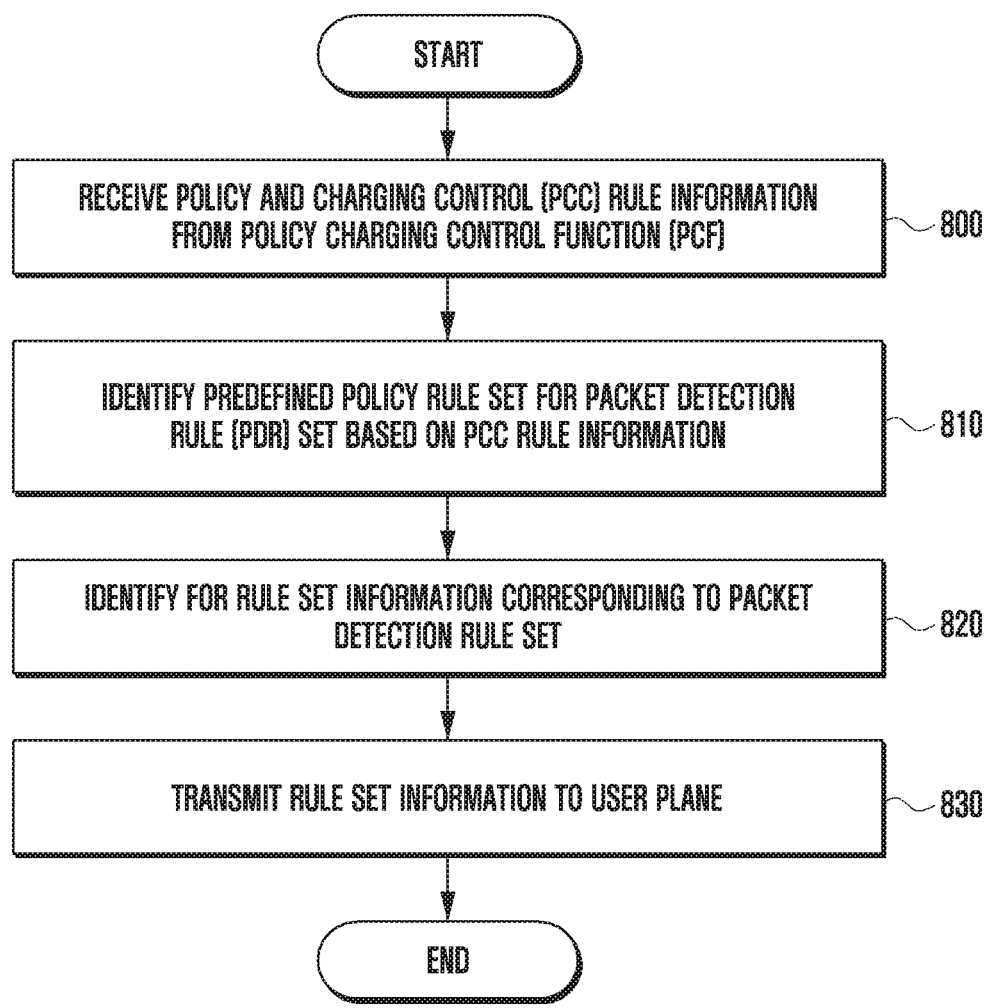
FIG. 8 is a flowchart illustrating a procedure for a CP to send rule set information including at least one rule associated with a session to a UP for data services according to an embodiment of the disclosure.

FIG. 8 is a flowchart illustrating a procedure for a CP to send rule set information including at least one rule associated with a session to a UP for data services according to an embodiment of the disclosure.

Referring to FIG. 8, at operation 800, the CP may receive PCC rule information from a PCF.

At operation 810, the CP may identify predetermined policy rule sets for a packet detection rule (PDR) set based on the PCC rule information.

For example, the predefined policy rule sets may be stored in the CP and the UP in the form of a DB, the policy rule sets being provided by the operator.

For example, the packet detection rule set may include multiple packet detection rules.

For example, the information on each of the packet detection rules included in the packet detection rule set may be mapped to information on at least one of a forwarding action rule, a QoS enforcement rule, and a usage reporting rule.

At operation 820, the CP may identify rule set information corresponding to the packet detection rule set.

For example, the rule set information may include at least one of identity information, indication information, and index information of the packet detection rule.

At operation 830, the CP may send the rule set information to the UP.

For example, the rule set information may be conveyed in at least one of a session establishment request message or a session change request message.

Figure 9:
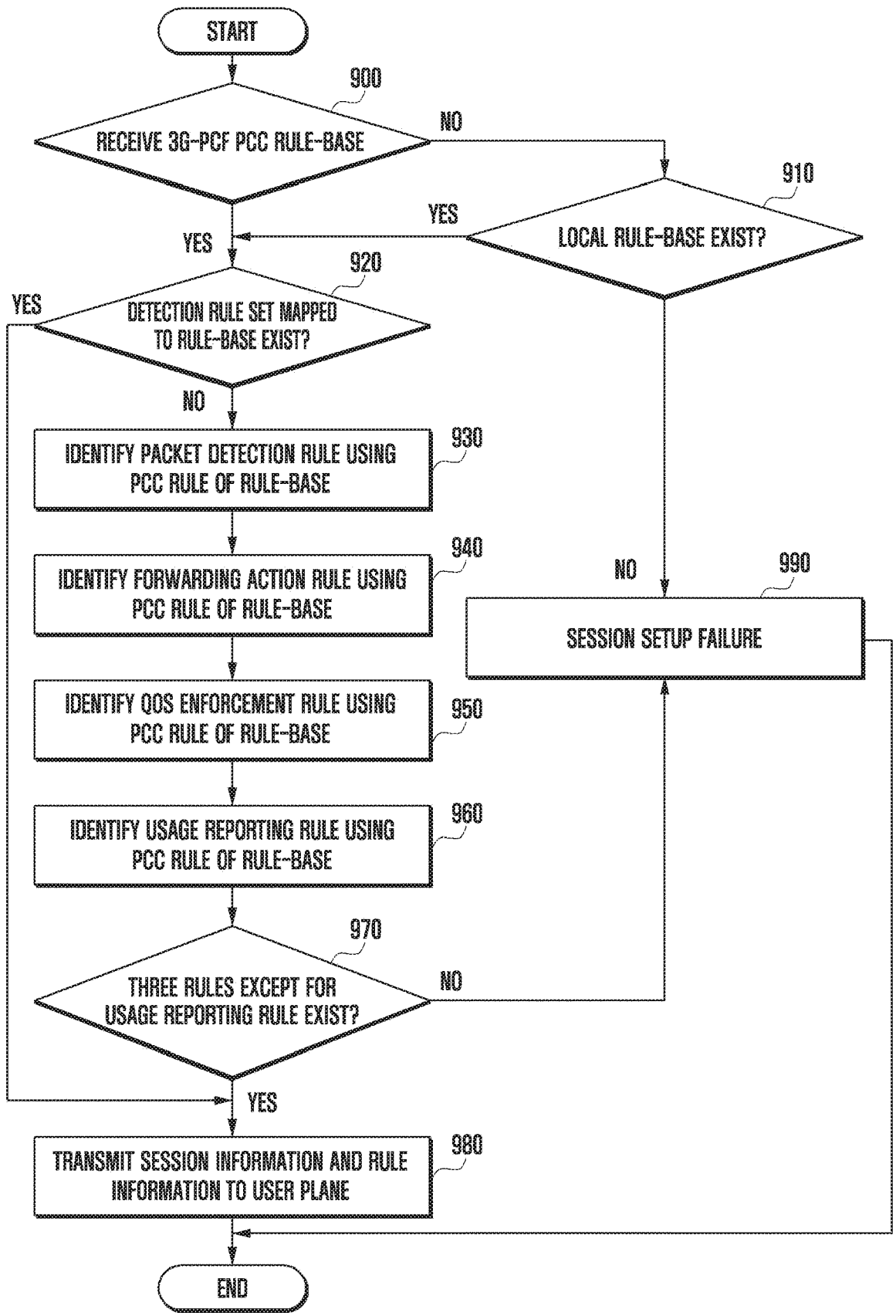
FIG. 9 is a flowchart illustrating a procedure for a CP to send rule set information including at least one rule associated with a session for a data service to a UP according to an embodiment of the disclosure.

FIG. 9 is a flowchart illustrating a procedure for a CP to send rule set information including at least one rule associated with a session for a data service to a UP according to an embodiment of the disclosure.

Referring to FIG. 9, if it is determined at operation 900 that PCC Rule-Base information is received from a PCF, or if it is determined at operation 900 that no PCC Rule-Base information is received and if it is determined at operation 910 that a Local Rule-Base exists, the CP may determine at operation 920 whether a packet detection rule set mapped to the PCC Rule-Base or the Local Rule-Base is included in preconfigured policy rule sets.

If it is determined at operation 900 that no PCC Rule-Base information is received and if it is determined at operation 910 that no Local Rule-Base exists, the CP may assume session setup failure at operation 990 and terminate the procedure.

If it is determined at operation 920 that a packet detection rule set mapped to the PCC Rule-Base or the Local Rule-Base is included in preconfigured policy rule sets, the CP may send, at operation 980, rule set information corresponding to the packet detection rule set to the UP.

If it is determined that no packet detection rule set mapped to the PCC Rule-Base or the Local Rule-Base is included in preconfigured policy rule sets, the CP may sequentially generate a packet detection rule at operation 930, a forwarding action rule at operation 940, a QoS enforcement rule at operation 950, and a usage reporting rule at operation 960, based on the PCC rule.

If it is determined at operation 970 that three rules (i.e., packet detection rule, forwarding action rule, and QoS enforcement rule), except for the usage reporting rule among all the rules, exist, the CP may send, at operation 980, the session information and information on all of the aforementioned rules to the UP.

Meanwhile, if it is determined at operation 970 that at least one of the packet detection rule, forwarding action rule, and QoS enforcement rule among all the rules except for the usage reporting rule does not exist, the CP may assume session setup failure at operation 990 and terminate the procedure.

As described above, the proposed method allows the CP to send the rule set information corresponding to the PDR set in the case where a PDR set mapped to the PCC Rule-Base received from the 5G PCF exists in the pre-stored DB, thereby making it possible to reduce a message size and a signaling amount, and skip generating the rules as in operations 930 to 960, and reduce session setup time, as compared with the technology in which all information on the multiple rules necessary for session setup is transmitted as described in FIG. 3.

Figure 10:
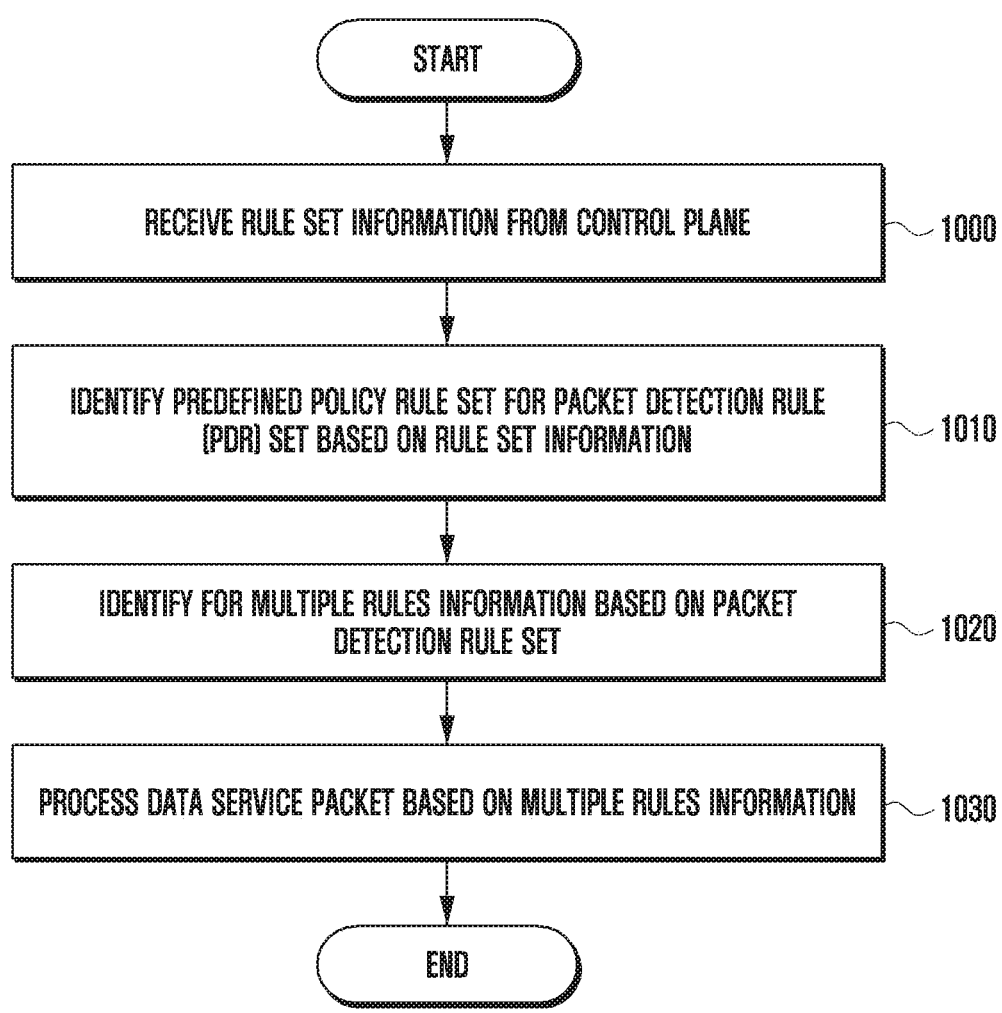
FIG. 10 is a flowchart illustrating a procedure for a UP to process data service packets based on rule set information received from a CP for a data service according to an embodiment of the disclosure.

FIG. 10 is a flowchart illustrating a procedure for a UP to process data service packets based on rule set information received from a CP for a data service according to an embodiment of the disclosure.

Referring to FIG. 10, at operation 1000, the UP may receive the rule set information from the CP.

For example, the rule set information may include at least one of identity information, indication information, and index information of a packet detection rule set.

For example, the rule set information may be conveyed in at least one of a session establishment request message or a session modification request message.

At operation 1010, the UP may identify predefined policy rule sets for a packet detection rule (PDR) set.

For example, the predefined policy rule sets may be stored in the CP and the UP in the form of a DB, the predefined policy rule sets being provided by the operator.

For example, the packet detection rule set may include information on multiple packet detection rules.

At operation 1020, the UP may identify for information on the multiple rules based on the packet detection rule set.

For example, the information on the multiple rules may include information on a packet detection rule selected, on the basis of a priority order, among the multiple packet detection rules included in the packet detection rule set.

For example, the information on the multiple rules may include information on at least one of a forwarding action rule, a QoS enforcement rule, and a usage reporting rule mapped to the information on the selected packet detection rule.

At operation 1030, the UP may process data service packets based on the information on the multiple rules.

For example, the UP may apply the information on multiple rules to a session and forward the data service packets in the session to which the information is applied.

Figure 11:
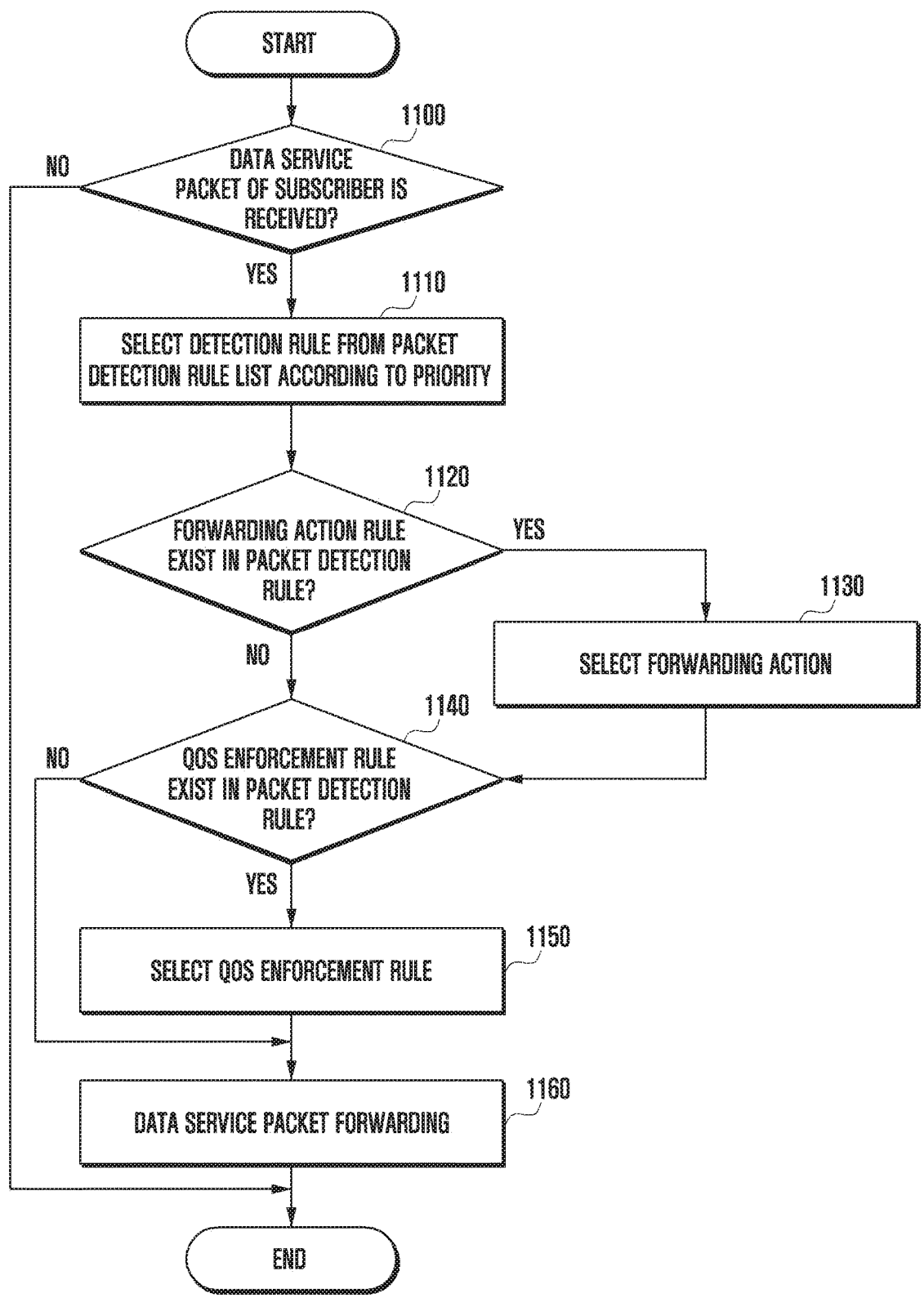
FIG. 11 is a flowchart illustrating a procedure for a UP to establish a session based on rule set information received from a CP for a data service according to an embodiment of the disclosure.

FIG. 11 is a flowchart illustrating a procedure for a UP to establish a session based on rule set information received from a CP for a data service according to an embodiment of the disclosure.

Referring to FIG. 11, if it is determined at operation 1100 that a data service packet for a subscriber is received, the UP may select, at operation 1110, a detection rule from a packet detection rule list based on a priority order.

The UP may determine at operation 1120 whether the packet detection rule includes a forwarding action rule and, if so, select the forwarding action rule at operation 1130 and determine at operation 1140 whether the packet detection rule includes a QoS enforcement rule.

Meanwhile, if it is determined at operation 1120 that the packet detection rule includes no forwarding action rule, the UP may determine at operation 1140 whether the packet detection rule includes a QoS enforcement rule.

If it is determined at operation 1140 that the packet detection rule includes a QoS enforcement rule, the UP may select the QoS enforcement rule at operation 1150 and perform data service packet forwarding at operation 1160.

Meanwhile, if it is determined at operation 1140 that the packet detection rule includes no QoS enforcement rule, the UP may perform data service packet forwarding at operation 1160.

As described above, because the UP has a predetermined packet detection rule set including a packet detection rule set to which a forwarding action rule and a QoS enforcement rule are mapped, it can select rules without the priority order-based rule list search and rule mapping operation of the method described with reference to FIG. 4.

That is, the UP may apply the rules selected from the detection rule list information identified based on the PDR set received from the CP, e.g., the UP may acquire the information on the forwarding action rule, QoS enforcement rule, and usage reporting rule mapped to a detection rule and apply the rules to the session.

According to various disclosed embodiments, the UP may forward data service packets arriving for a subscriber based on information on predetermined rules as well as the information on the rules that is dynamically generated as described with reference to FIG. 4.

FIG. 12 is a diagram illustrating a message format including information related to a rule set according to an embodiment of the disclosure.

Referring to FIG. 12, a PFCP session establishment or modification message 1200 may include an Active PDRSET 1210 as an information element (IE) corresponding to session-related rule set information and an Active PDR 1220 as an IE corresponding to session-related multiple rules.

Figure 13:
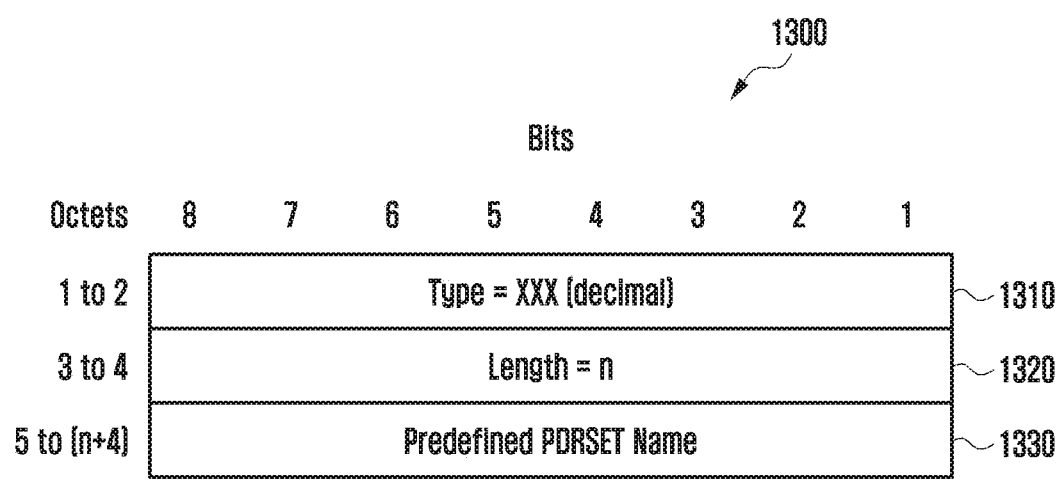
FIG. 13 is a diagram illustrating various types of information related to a rule set according to an embodiment of the disclosure.

FIG. 13 is a diagram illustrating various types of information related to a rule set according to an embodiment of the disclosure.

Figure 14:
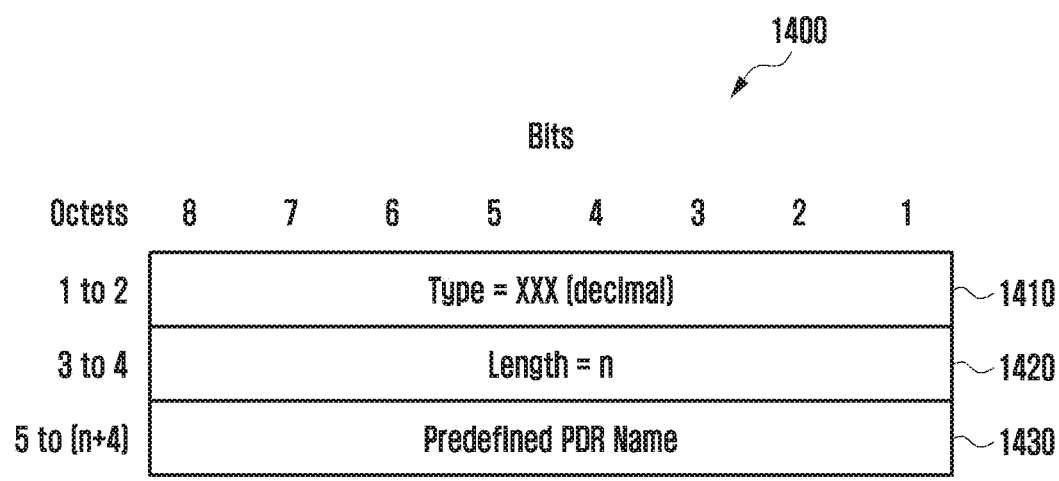
FIG. 14 is a diagram illustrating various types of information related to a rule set according to an embodiment of the disclosure.

FIG. 14 is a diagram illustrating various types of information related to a rule set according to an embodiment of the disclosure.

Referring to FIG. 13, it is a diagram illustrating an IE type of the Active PDRSET 1210 of FIG. 12, and FIG. 14 is a diagram illustrating an IE type of the Active PDR 1220 of FIG. 12.

Referring to FIG. 13, the Predetermined PDRSET Name 1330 is the name of the predefined PDRSET referencing at least one predefined rule necessary to be activated in the UP.

For example, the Predetermined PDRSET Name 1330 may also be referred to as "STREAM-PDRSET", "INTERNET-PDRSET", "YOUTUBE-PDRSET", or "FREE-PDRSET".

Referring to FIG. 14, the Predetermined PDR Name 1430 is the name of the predetermined PDR as a rule necessary to be activated in the UP.

Figure 15:
FIG. 15 is a diagram illustrating a table exemplifying PCC Rule-Base information including rule set information in use by a CP according to an embodiment of the disclosure.

FIG. 15 is a diagram illustrating a table exemplifying PCC Rule-Base information including rule set information in use by a CP according to an embodiment of the disclosure.

Referring to FIG. 15, according to various disclosed embodiments, the operator may add PDR set identity information for use by a UP to the PCC Rule/Rule-Base to be applied to data services for all subscribers.

For example, Packet Detect Rule Name information 1520 may be added to the PCC Rule/Rule-Base information 1500 as shown in FIG. 15. The PCC Rule/Rule-Base information 1500 also includes a Rule-Base Name 1510, a PCC Rule List 1530 and an Index 1540.

FIG. 16 is a diagram illustrating a table exemplifying PCC Rule information corresponding to rule set information in use by a CP according to an embodiment of the disclosure.

Referring to FIG. 16, it shows information on a PCC rules 1600 indicated by Packet Detect Rule Name information 1520 in FIG. 15. The PCC rules 1600 includes Rule Name 1610 and Packet Detect Rule 1620.

FIG. 17 is a diagram illustrating a table exemplifying PDR set information including information on rule sets in use by a UP according to an embodiment of the disclosure.

Referring to FIG. 17, according to various embodiments, the operator may generate preconfigured PDR set information for a traffic packet service as shown in FIG. 17. A Packet Detection Rule Set 1700 includes a Set Name 1710, a Packet Detection Rule List 1720 and an Index 1730.

Figure 18:
FIG. 18 is a diagram illustrating a table exemplifying PDR information corresponding to rule set information in use by a UP according to an embodiment of the disclosure.

FIG. 18 is a diagram illustrating a table exemplifying PDR information corresponding to rule set information in use by a UP according to an embodiment of the disclosure.

Referring to FIG. 18, it shows information on a forwarding action rule, a QoS enforcement rule, and a usage reporting rule mapped to a packet detection rule corresponding to the PDR set information depicted in FIG. 17. A Packet Detection Rule 1800 includes a Rule Name 1810, a Forwarding Action Rule 1820 and a Usage Reporting Rule 1830.

As described above, the 5G core control plane function disclosed in the various embodiments is advantageous in terms of reducing a signaling message size and a number of signaling messages being transferred from the CP to the UP using a proposed predefined rule set configuration function in configuring (provisioning) a rule for a traffic data service to a core user plane function.

The predefined rule set-based configuration method proposed in the various embodiments is also advantageous in terms of facilitating management and readability of each of the rules of a core function operator.

In the disclosed embodiments, the components are described in singular or plural forms depending on the embodiment. However, the singular and plural forms are selected appropriately for the proposed situation just for explanatory convenience without an intention of limiting the disclosure thereto; thus, the singular form includes the plural form as well, unless the context clearly indicates otherwise.

Although the description has been made with reference to particular embodiments, the disclosure can be implemented with various modifications without departing from the scope of the disclosure. Thus, the disclosure is not limited to the particular embodiments disclosed, and it will include the following claims and their equivalents.

Various disclosed embodiments and terms used herein are not intended to limit the disclosure, but rather they are to help understand the disclosure, and it should be understood that the embodiments include all changes, equivalents, and/or substitutes within the spirit and scope of the disclosure. The same reference numbers are used throughout the drawings to refer to the same or like parts. As used herein, the singular forms "a," "an," and "the" are intended to include the plural forms as well, unless the context clearly indicates otherwise. In various disclosed embodiments, expressions such as "A or B," "at least one of A and/or B," "A, B, or C," or "at least one of A, B, and/or C" may include all possible combinations of the enumerated items. In the various disclosed embodiments, terms such as "$1^{st}$," "$2^{nd}$," "first," "second," etc. are used to modify corresponding components and distinguish among different components without restricting the order and/or importance thereof. When it is mentioned that a (first) component is "(functionally or communicatively) connected" to or "accessed" by another (second) component, it may be understood that the component is directly connected to or accessed by the other component or that still another (third) component is interposed between the two components.

In the disclosed embodiments, the term "module" means, but is not limited to, a unit of one of software, hardware, and firmware or any combination thereof; the term "module" may be used interchangeably with the terms "unit," "logic," "logical block," "component," or "circuit." The term "module" may denote a smallest unit of a component or a part thereof. For example, a module may be configured in the form of an Application-Specific Integrated Circuit (ASIC) chip.

The various disclosed embodiments may be implemented in the form of a software program (e.g., program) including instructions stored in a machine-readable (e.g., computer-readable) storage medium (e.g., internal memory and external memory). The machine may be a device which is capable of calling out and executing an instruction from the storage medium to perform an operation, and examples of the machine may include the secondary base station or UE disclosed in the various embodiments. If the instruction is executed by a processor (e.g., controller 520 in FIG. 5, controller 620 in FIG. 6, controller 740, or controller 780 in FIG. 7), the processor may execute a corresponding function autonomously or control other components to execute the corresponding function. The instruction may include a code generated or executed by a compiler or an interpreter.

The machine-readable storage medium may be a non-transitory storage medium. As used herein, the expression "non-transitory" is used to intend that the storage medium includes no signal and is tangible regardless of whether data is stored in the storage medium semi-persistently or temporarily.

A method according to any of various disclosed embodiments may be provided in the form of a computer program product. The computer program product may be traded between a seller and a buyer. The computer program product may be distributed on a machine-readable storage medium (e.g., compact disc read only memory (CD-ROM)) or through an application store (e.g., Playstore™). In the case of on-line distribution, at least part of the computer program product may be temporarily stored or instantly generated in a storage medium such as a memory of a manufacturer's server, an application store server, or a relay server.

The components (e.g., module and program) according to various disclosed embodiments may include at least one of the aforementioned components with omission of some components or addition of other components. Alternatively or additionally, the components (e.g., module and program) may be selectively combined into an entity to perform the functions of the components equally as before the combination or in similar manners. The operations of the modules, programming modules, or other components according to various disclosed embodiments may be executed in series, in parallel, recursively, or heuristically; also, some operations may be executed in different order, omitted, or extended with other operations.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for a control plane to transmit rule information to a user plane, the method comprising:
storing, by a memory, predefined policy rule sets including a packet detection rule (PDR) set;
receiving, by a transceiver, policy and charging control (PCC) rule information from a policy control function (PCF);
identifying, by a processor, the PDR set based on the PCC rule information and the predefined policy rule sets;
identifying, by the processor, rule set information corresponding to the PDR set; and
transmitting, by the transceiver, the rule set information to the user plane,
wherein the PDR set includes multiple pieces of PDR information, and
wherein the multiple pieces of rule information includes one piece of PDR information selected among the multiple pieces of PDR information included in the PDR set based on a priority order.

2. The method of claim 1, wherein the rule set information includes at least one of identity information, indication information, or index information of the PDR set.

3. The method of claim 1, wherein the predefined policy rule sets are stored in both the control plane and the user plane.

4. The method of claim 1, wherein the rule set information is transmitted via at least one of a session establishment request message or a session modification request message.

5. The method of claim 1, wherein the multiple pieces of PDR information are each mapped to at least one of forwarding action rule information, quality of service (QoS) enforcement rule information, or usage reporting rule information.

6. A method for a user plane to receive rule information from a control plane, the method comprising:
storing predefined policy rule sets including a packet detection rule (PDR) set;
receiving, by a transceiver, rule set information from the control plane;
identifying, by a processor, the PDR set based on the rule set information and the predefined policy rule sets;
identifying, by the processor, for multiple pieces of rule information based on the PDR set; and
processing, by the processor, a data service packet based on the multiple pieces of rule information,
wherein the PDR set includes multiple pieces of PDR information, and
wherein the multiple pieces of rule information includes one piece of PDR information selected among the multiple pieces of PDR information included in the PDR set based on a priority order.

7. The method of claim 6, wherein the rule set information includes at least one of identity information, indication information, or index information of the PDR set.

8. The method of claim 6, wherein the predefined policy rule sets are stored in both the control plane and the user plane.

9. The method of claim 6, wherein the multiple pieces of rule information include at least one of forwarding action rule information, quality of service (QoS) enforcement rule information, or usage reporting rule information that are mapped to the selected one piece of PDR information.

10. A control plane for sending rule information to a user plane, the control plane comprising:
a transceiver;
a processor coupled to the transceiver; and
a storage unit coupled to the processor and configured to store predefined policy rule sets including a packet detection rule (PDR) set,
wherein the processor is configured to control to:
receive, by the transceiver, policy and charging control (PCC) rule information from a policy control function (PCF),
identify the PDR set based on the PCC rule information and the predefined policy rule sets,
identify rule set information corresponding to the PDR set, and transmit, by the transceiver, the rule set information to the user plane,
wherein the PDR set includes multiple pieces of PDR information, and
wherein the multiple pieces of rule information includes one piece of PDR information selected among the multiple pieces of PDR information included in the PDR set based on a priority order.

11. The control plane of claim 10, wherein the rule set information includes at least one of identity information, indication information, or index information of the PDR set.

12. The control plane of claim 10, wherein the predefined policy rule sets are stored in a storage unit of the user plane.

13. The control plane of claim 10, wherein the rule set information is transmitted via at least one of a session establishment request message or a session modification request message.

14. The control plane of claim 10, wherein the multiple pieces of PDR information are each mapped to at least one of forwarding action rule information, quality of service (QoS) enforcement rule information, or usage reporting rule information.

15. A user plane for receiving rule information from a control plane, the user plane comprising:
 a transceiver;
 a processor coupled to the transceiver; and
 a storage unit coupled to the processor and configured to store predefined policy rule sets including a packet detection rule (PDR) set,
 wherein the processor is configured to control to:
  receive, by the transceiver, rule set information from the control plane,
  identify the PDR set based on the rule set information and the predefined policy rule sets,
  identify multiple pieces of rule information based on the PDR set, and
  process a data service packet based on the multiple pieces of rule information,
 wherein the PDR set includes multiple pieces of PDR information, and
 wherein the multiple pieces of rule information includes one piece of PDR information selected among the multiple pieces of PDR information included in the PDR set based on a priority order.

16. The user plane of claim 15, wherein the rule set information includes at least one of identity information, indication information, or index information of the PDR set.

17. The user plane of claim 15, wherein the predefined policy rule sets are stored in a storage unit of the control plane.

18. The user plane of claim 15, wherein the multiple pieces of rule information include at least one of forwarding action rule information, quality of service (QoS) enforcement rule information, or usage reporting rule information that are mapped to the selected pieces of PDR information.

* * * * *